United States Patent
Chikama

[11] 3,856,000
[45] Dec. 24, 1974

[54] ENDOSCOPE
[75] Inventor: Toshio Chikama, Tokyo, Japan
[73] Assignee: Kabushiki Kaisha Machido Seisakusho, Tokyo, Japan
[22] Filed: May 16, 1973
[21] Appl. No.: 360,945

[30] Foreign Application Priority Data
June 19, 1972 Japan.................. 47-71361

[52] U.S. Cl. ................................... 128/6
[51] Int. Cl. ................................ A61b 1/06
[58] Field of Search .............. 128/3, 4, 6, 7, 8, 9

[56] References Cited
UNITED STATES PATENTS
2,987,960   6/1961   Sheldon .................... 128/6 X
FOREIGN PATENTS OR APPLICATIONS
1,261,275   2/1968   Germany ................... 128/6

Primary Examiner—Lucie H. Laudenslager
Attorney, Agent, or Firm—Waters, Rodditi, Schwartz & Nissen

[57] ABSTRACT

An endoscope comprising a main tube formed at its front end with an observation window extending over its front surface to one side surface. A turnable prism is interposed in the tube between the window and an optical system lens for image observation, such that by turning the prism through the agency of an operation wire operable at the base end portion of the main tube, a visual field extending from the front surface to the side surface can be observed. A shading plate is mounted in the tube and is movable with the turning of the prism to block passage of incident light to the optical system from the side surface at the time of front surface observation.

7 Claims, 2 Drawing Figures

PATENTED DEC 24 1974  3,856,000
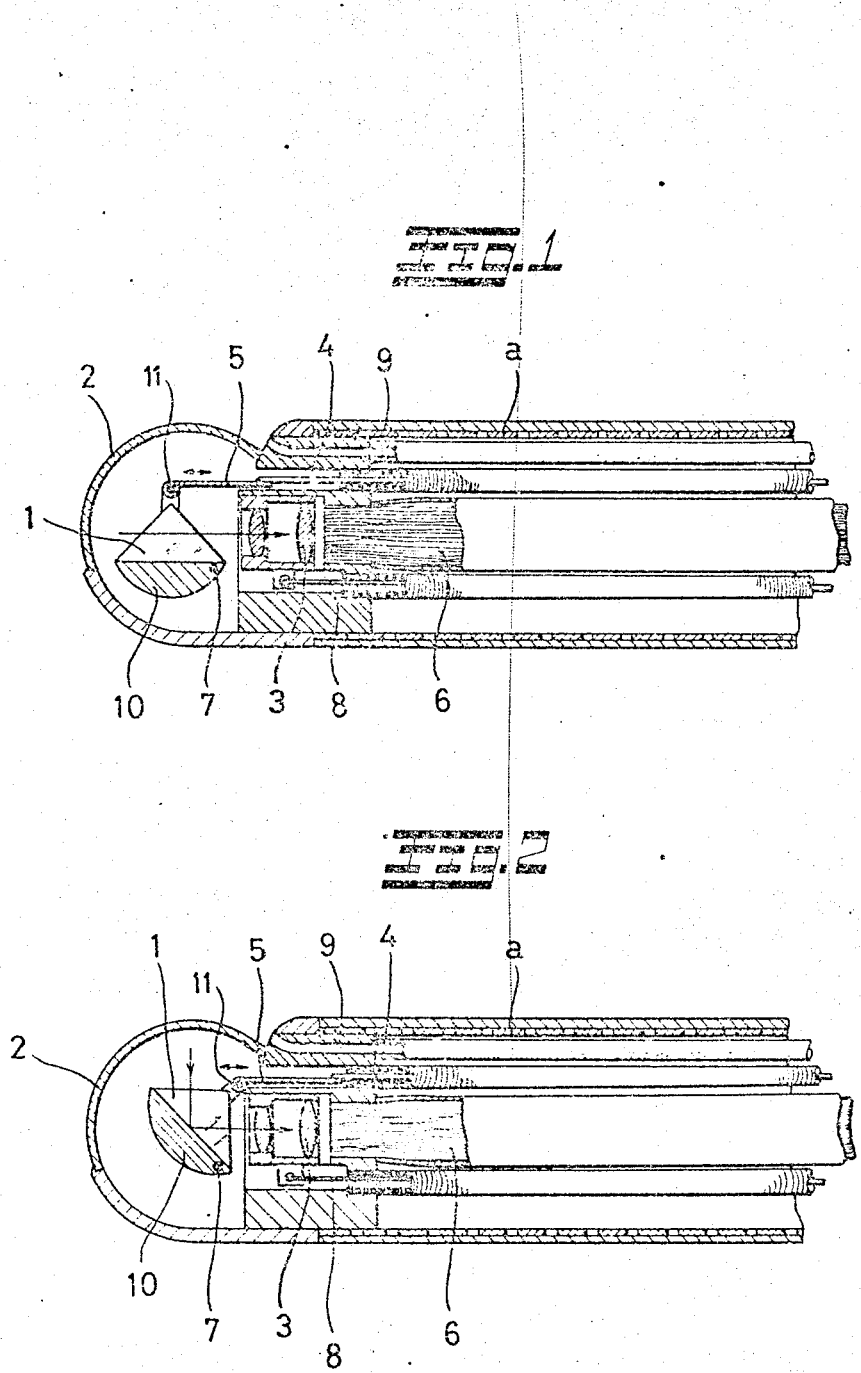

ENDOSCOPE

BRIEF SUMMARY OF THE INVENTION

This invention relates to an endoscope of the type in which a visual field extending from its front surface to one side surface can be observed by turning of a prism, and more particularly to such an endoscope wherein at the time of front surface observation the observation effect is hindered by the passage of incident light to the optical system from the side surface:

An object of the invention is to provide an endoscope of the above type in which the passage of incident light to the optical system from the side surface is blocked at the time of front surface observation.

To achieve the above and further objects the invention contemplates an endoscope comprising a tube having a front end with an observation window thereat, said window having a front observation surface and one side observation surface, optical means in said tube for transmitting light and images therethrough, a pivotal optical element supported in said tube between said window and said optical means for transmitting an image viewed through the window to the optical means and for transmitting light from the optical means to the window, means for moving the optical element between a first position for receiving an image through the front observation surface and a second position for receiving an image through the side observation surface, and shading means in said tube movable with said optical element for blocking passage of incident lights to said optical element from said side surface when the optical element is in said first position.

In a particular embodiment the shading means comprises a shading plate displaceably supported in the tube for movement with the optical element.

The shading plate is pivotaly connected to the optical element and in one embodiment is connected to an actuator member so as to transmit movement of the actuator to the optical element. Thereby, the optical element and shading plate are constrained to move conjointly.

BRIEF DESCRIPTION OF THE DRAWING

FIG. 1 is a sectional side view of the operative portion of the endoscope of the invention at the time of front surface observation, and FIG. 2 is a sectional side view of the same portion at the time of side surface observation.

DETAILED DESCRIPTION

Referring to the drawing, reference character $a$ denotes a main tube of an endoscope and the tube is provided at its front end with an observation window 2 extending over a front surface to one side surface. Mounted within the main tube $a$ is an image guide rod 6 constituted by a bundle of optical glass fibers, and a lens 3 is mounted in front of the rod 6 so as to be movable forwards and backwards. An optical element in the form of a prism 1 is turnable about a pivot 7 and is interposed between the lens 3 and the observation window 2, so that by turning the prism 1 through the operation of a control wire 4 operable at the base end (not shown) of the main tube $a$, observation through the front surface or the side surface can be effected, respectively, through the observation window 2. In a conventional technique, such as in U.S. Pat. No. 3,703,169, a light guide rod constituted by a bundle of optical glass fibers, similar to the image guide rod 6, is inserted in the main tube $a$ and is directed at its front end toward the observation window 2 and at its rear end toward any suitable light source, so that the field which is to be observed can be illuminated thereby. As in the conventional technique, illumination is made from the base end of the endoscope via the rear end of the light guide rod. Numeral 8 denotes an operation wire for advancing and retracting the lens 3, numeral 9 denotes a pipe for the discharge of air or liquid, and numeral 10 denotes a holding frame for the prism 1.

In the above endoscope, by turning the prism 1 through the operation of wire 4, any portion of the visual field extending from the front surface to the side surface is scanned and observed through the lens 3 and the image guide rod 6 at the base end portion of the main tube a. In this operation, at the time of side surface observation, an image of the illuminated field passes through the side surface of the window and continues through one face of the prism and is reflected from a back surface of the prism in FIG. 2. Any system from the front is shielded by the holding frame 10 of the prism 1, whereas at the time of front surface observation, the incident light from the side surface comes into the optical system and hinders the observation effect and thereby a clear image cannot be obtained.

To prevent this, according to this invention, a shading plate 5 is provided for shielding the incident light coming from the side surface at the time of front surface observation. The shield 5 is so arranged that it is advanced to and retracted from its operating position in conjunction with turning of the prism 1. Specifically, the shading plate 5 is pivotally connected at 11 at its front end to the prism holding frame 10 which is turnable about the pivot 7, so that, as illustrated in FIG. 1 when the prism 1 is turned to its front surface observation position the shading plate 5 is advanced to shield the incident light entering from the side surface, and as illustrated in FIG. 2 the shading plate 5 is retracted from the foregoing position when the prism 1 is turned to the position of side surface observation.

In the illustrated embodiment, the front end of the operation wire 4 is not connected directly to the prism, but indirectly through the shading plate 5. Such a modification, however, is possible in which the front end of the operation wire 4 is directly connected to the holding frame 10, the shading plate 5 remaining pivotally connected at its front end to the holding frame 10 and being made free at its rear end.

Thus, according to the invention, when the front surface is observed through the turnable prism 1, the shading plate 5 is in extended position and fully shields any incident light entering from the side surface whereby the observation is not hampered, whereas at the time of side surface observation, the shading plate 5 is retracted concurrently with the turning of the prism 1 and does not constitute any obstacle to side entry of light and thus the observation of the visual field extending from the front surface to the side surface can be assured.

What is claimed is:

1. An endoscope comprising a tube having a front end with an observation window thereat, said window having a front observation surface and one side observation surface, optical means in said tube for transmitting light and images therethrough, a pivotal optical element supported in said tube between said window and said optical means for transmitting an image viewed through the window back to the optical means, means for moving the optical element between a first position for receiving an image through the front observation surface and a second position for receiving an image through the side observation surface, and a shading plate displaceably supported in the tube for movement with the optical element for blocking passage of incident light to said optical element from said side surface when the optical element is in said first position.

2. An endoscope as claimed in claim 1 wherein said shading plate is pivotably connected to said optical element.

3. An endoscope as claimed in claim 2 wherein said optical element is a triangular prism having two side surfaces for passage of light and a third back surface which is reflective.

4. An endoscope as claimed in claim 3 wherein said shading plate covers one of said side surfaces of the prism in the position of the optical element for receiving an image through the front observation surface.

5. An endoscope as claimed in claim 4 wherein said means for moving the optical element comprises a manually actuable element passing through said tube.

6. An endoscope as claimed in claim 5 wherein said manually actuable element is connected to said shading plate to move the optical element via said shading plate.

7. An endoscope as claimed in claim 1 wherein said shading plate is moved to a retracted position when the optical element is moved to said second position.

* * * * *